United States Patent Office 2,712,001
Patented June 28, 1955

2,712,001

SULFONAMIDE-EPOXIDE COMPOSITIONS

Sylvan Owen Greenlee, Racine, Wis., assignor to Devoe & Raynolds Company, Inc., Louisville, Ky., a corporation of New York No Drawing. Application March 17, 1952,
Serial No. 277,072

10 Claims. (Cl. 260—47)

This invention relates to new complex sulfonamide-epoxide compositions, and more particularly to such compositions capable of conversion into insoluble, infusible products, and valuable for use in making varnishes and protective coatings, in making molding compositions and articles, as adhesives, and in making films and fibres, etc. The invention includes various new sulfonamide-epoxy compositions and reaction products and articles and products made therefrom.

The new sulfonamide-epoxy compositions and products are made by reacting aromatic sulfonamides with complex epoxides produced by the reaction of polyhydric phenols with polyfunctional halohydrins or with polyepoxides to form complex reaction products containing terminal epoxide groups. Such epoxide products with which the sulfonamide is reacted are advantageously complex polymeric products resulting from the reaction of polyhydric phenols with polyfunctional halohydrins or polyepoxides in proportions to give terminal epoxide groups in the polymeric reaction products. Such complex epoxide products and compositions are described in my applications Serial Nos. 199,931 (now Patent No. 2,615,007), 250,951 (now Patent No. 2,615,008) and 626,449 (now Patent No. 2,592,560).

One of the objects of the present invention is the production of infusible and insoluble reaction products of complex epoxides and sulfonamides in suitable proportions which have remarkable chemical resistance combined with hardness, toughness, flexibility, lack of contraction on conversion, and other desirable properties.

Another object of the invention is the production of sulfonamide-epoxide compositions capable of use as raw materials for the production of such conversion products.

Another object of the invention is the production of compositions and reaction products of polyepoxides with sulfonamides in proportions giving final infusible products of remarkable chemical resistivity and other desirable properties.

Another object of the invention is the production of solutions of such sulfonamide-epoxy compositions for use in making varnishes and protective coatings, impregnating solutions, films, filaments, etc.

Another object of the invention is the production of molding mixtures and compositions capable of conversion into infusible, molded articles and products, and the articles and products so produced.

Other objects of the invention and the nature and advantages of the invention will further appear from the following more detailed description.

In my companion applications Serial Nos. 199,931 (now Patent No. 2,615,007) and 250,951 (now Patent No. 2,615,008), I have described complex, polymeric reaction products of polyhydric phenols with polyfunctional halohydrins such as epichlorhydrin and glycerol dichlorhydrin, with the difunctional chlorhydrin used in proportions in excess of that equivalent to the polyhydric phenol and less than twice the equivalent amount, by carrying out the reaction with the addition of caustic alkali equal to or somewhat in excess of the amount required to combine with the halogen of the halohydrin and giving complex, polymeric products containing both terminal epoxy groups and terminal primary hydroxyl groups, and with the epoxy groups in general considerably in excess of the terminal primary hydroxy groups. Such complex, polymeric epoxy-hydroxy products and compositions are advantageously used for reaction with sulfonamides to form the new sulfonamide-epoxy compositions and products of the present invention.

In my companion application Serial No. 250,951 (now Patent No. 2,615,008) and in my Patent No. 2,582,985, I have described epoxy-hydroxy compositions resulting from the reaction of a polyhydric phenol with a polyfunctional halohydrin such as epichlorhydrin in approximate proportions of 2 mols of epichlorhydrin to one of dihydric phenol to give resinous products containing both terminal epoxy and hydroxy groups with the proportion of terminal epoxy groups considerably in excess of the terminal hydroxy groups. Such epoxy-hydroxy compositions are also advantageously used in forming the new sulfonamide-epoxy compositions and products of the present invention.

In my companion application Serial No. 626,449 (now Patent No. 2,592,560), I have described new polyepoxy products and compositions obtained by the direct addition of polyhydric phenols with polyepoxides and with the proportion of polyepoxides reacting with the polyhydric phenols in excess of the equivalent amount so that the resulting reaction products will contain terminal epoxy groups. Such polyepoxy reaction products, and particularly complex, polymeric, polyepoxy reaction products, are advantageously used in making the new sulfonamide-epoxy compositions and products of the present invention.

Such complex epoxides are polymeric polyethers of polyhydric phenols and particularly of dihydric phenols having alternating phenol residues and aliphatic groups, including hydroxyl-containing intermediate aliphatic groups and epoxide-containing terminal aliphatic groups and in general are free from functional groups other than hydroxyl and epoxide groups.

The sulfonamides used in making the new compositions are aromatic sulfonamides, such as those of the benzene and naphthalene series, including benzene sulfonamide, toluene sulfonamides (o-, p-, and m-), naphthalene sulfonamides, etc., including aromatic monosulfonamides and disulfonamides, etc. A particularly advantageous sulfonamide for use in making the new compositions in paratoluene sulfonamide.

Apparently all hydrogens directly attached to nitrogen of the sulfonamides are active hydrogens in reacting with epoxide groups. With the sulfonamides, it is advantageous to use a catalyst, particularly if high molecular weight infusible products are desired. Alkaline and Friedel-Crafts type catalysts are effective in promoting the reaction of the epoxide groups with the sulfonamides.

The complex epoxide compositions used with the sulfonamides are themselves capable of polymerization by reaction of epoxy groups with hydroxyl groups, particularly in the presence of small amounts of a catalyst. The complex epoxy compositions made from polyhydric phenols and epichlorhydrin contain both terminal epoxy groups and terminal primary hydroxyl groups and, in general, the number of terminal epoxy groups is considerably in excess of the number of terminal primary hydroxyl groups. In polymeric products containing intermediate hydroxyl groups, the total number of hydroxyl groups may be considerably in excess of the number of epoxy groups. Polymerization of such complex epoxy-hydroxy compounds may take place through terminal epoxy and primary hydroxy groups to form long chain polymers or through terminal epoxy groups and intermediate hydroxyl groups to form polydimensional polymers.

In the case of polyepoxides made by the direct reaction of bis phenol with an excess of polyepoxide there will also be hydroxyl groups, and, in the case of polymeric products, the number of hydroxyl groups may be in excess of the terminal epoxy groups. Such products are capable of polymerization by reaction of terminal epoxide groups with intermediate hydroxyl groups to form complex, polydimensional polymers, particularly when a catalyst is used.

When such complex epoxide compositions are reacted with sulfonamides, particularly when catalysts are used, the action may be one of the direct addition through epoxide groups and it may be in part the reaction of epoxy and hydroxyl groups to form ether linkages, particularly where the sulfonamide is used in less than equivalent proportion such that there is insufficient sulfonamide to react with all of the epoxide groups.

The complex epoxide compositions which are reacted with the sulfonamides are resinous products which can be made of varying melting points, epoxide content, and degree of polymerization from soft resins to harder resins of higher melting point. In general, these resins are soluble, unless too highly polymerized, in solvents such as acetone, methyl ethyl ketone, diacetone alcohol, cyclohexanone, etc., and can be used in solution with the addition of the sulfonamide with or without catalyst, as the case may be, in forming liquid compositions for use e. g. in making clear or pigmented varnishes, in making transparent films and filaments, and in impregnating wood, fabrics and other porous material, etc.

The complex epoxides and polyepoxides used for reacting with the sulfonamide may themselves be carried to a high degree of polymerization in which case only a small amount of sulfonamide may be necessary to convert the highly polymerized epoxides into an infusible state. With products of lower melting point and lower degree of polymerization an increased amount of cross-linking or polymerization in the presence of the sulfonamide, or a large proportion of sulfonamide, may be necessary to give the final insoluble product.

In referring to equivalent amounts of sulfonamide and of the complex polyepoxides, each active hydrogen attached to nitrogen of the sulfonamide is considered equivalent to one epoxide group. The equivalent weight of the sulfonamide is the weight which will contain one such active sulfonamide hydrogen when used with an equivalent weight of the complex epoxides containing one epoxide group.

The epoxide equivalent of the complex epoxides used can be determined for practical purposes by determining the equivalent weight of the composition per epoxide group.

The epoxide content of the epoxide-hydroxy compositions hereinafter indicated were determined by heating a 1 gram sample of the epoxide composition with an excess of pyridine hydrochloride (made by adding 16 cc. of concentrated hydrochloric acid per liter of pyridine) at the boiling point for 20 minutes and back titrating the excess pyridine-hydrochloride with 0.1N sodium hydroxide using phenolphthalein as indicator, and considering the 1 HCl is equal to 1 epoxide group.

The following table gives illustrative examples of hydroxy-epoxy compositions resulting from the reaction of bis phenol with varying proportions of epichlorhydrin with the use of caustic soda according to said companion applications, the table giving the softening points of the resin, the equivalent weight to epoxide as determined by the above method, and the average molecular weight, in the case of the lower melting resins, as determined by the boiling point method.

| Example | Softening Point (Durrans Mercury Method), °C. | Equivalent Weight to Epoxide | Average Molecular Weight |
|---|---|---|---|
| I | 43 | 325 | 451 |
| II | 84 | 591.5 | 791 |
| III | 90 | 730 | 807 |
| IV | 100 | 860 | 1,133 |
| V | 121 | 1,248 | |
| VI | 132 | 1,158 | |
| VII | 146 | 3,155 | |

The complex epoxides in this table were made from the reaction of bis phenol and epichlorhydrin in varying proportions with the use of aqueous caustic alkali sufficient to combine with all of the chlorine of the epichlorhydrin or somewhat in excess thereof. Other complex epoxides can similarly be made from other polyhydric phenols which are similarly capable of reacting with sulfonamide although the properties of the different complex epoxides will vary somewhat with different polyhydric phenols used and with different proportions of phenol and epichlorhydrin and with different degrees of polymerization.

*Example VIII*

A complex epoxide was prepared from 6 mols of hydroquinone and 7 mols of epichlorhydrin with 7.5 mols of aqueous caustic soda, which had a softening point of 92° C. and an equivalent weight to epoxide of 1105.

*Example IX*

An epoxide composition was prepared from 6 mols of resorcinol and 7 mols of epichlorhydrin with 7.76 mols of aqueous sodium hydroxide, which had a softening point of 80° C. and an equivalent weight to epoxide of 1146.

The foregoing examples illustrate complex epoxy-hydroxy compositions such as are described in my companion applications Serial Nos. 199,931 and 250,951. Likewise, complex epoxides may be prepared from the further reaction of such complex epoxy-hydroxy compounds with polyhydric phenols used in amounts less than that which is equivalent to the epoxide content. Thus the complex epoxides of Examples I to IX can be further reacted with limited amounts of polyhydric phenols to give complex epoxides of higher molecular weight which are useful in reactions with sulfonamides according to the present invention, such further reaction products being described in said companion applications.

The complex epoxides which are useful for reaction with sulfonamides also include complex polyepoxides such as are described in my companion application Serial No. 626,449 made by reacting polyhydric phenols with simpler polyepoxides to give complex polyepoxides. The simpler polyepoxides used for reacting with polyhydric phenols and sulfonamides include new polyepoxides more particularly described in Examples I and II of said companion application Serial No. 626,449 and which are briefly described in Examples X and XI.

*Example X*

The polyepoxide is produced by reacting 3 mols of glycerine with 9 mols of epichlorhydrin using boron trifluoride as a condensing agent and finally treating the resulting reaction product with sodium aluminate to give a polyepoxide in the form of a pale yellow product having an epoxide equivalent of 149 and an average molecular weight as determined by the standard boiling point elevation method of 324, representing an average of 2.175 epoxide groups per molecule, assuming the determined molecular weight is the molecular weight.

Example XI

A polyepoxide composition is similarly prepared from 1 mol of trimethylol propane and 3 mols of epichlorhydrin condensed with boron trifluoride and finally treated with sodium aluminate to give a pale yellow liquid having an equivalent weight to epoxide of 151 and an average molecular weight of 292.2, corresponding to approximately 1.94 epoxide groups per molecule, assuming an average molecular weight. Other new polyepoxy products can similarly be made from other polyhydric alcohols containing 3 or more hydroxyl groups as described in said companion application Serial No. 626,449.

The preparation of new complex epoxides by the reaction of simpler polyepoxides with polyhydric phenols is illustrated by the following Examples XII to XVI.

Example XII

An epoxide composition was prepared by heating 0.3 mols of diglycid ether with 0.2 mols of bis phenol at 190–215° C. for 1½ hours to give a product softening at 89° C. and having an equivalent to epoxide of 1460.

Example XIII

To 29.8 parts of the product of Example X was added 11.4 parts of bis phenol and this mixture was heated gradually to 173° C. and held at 162–173° C. for 2 hours. The resulting product was a viscous, tacky syrup having an epoxide equivalent of 479.

Example XIV

To 4.6 parts of bis phenol and 4.3 parts of diglycid ether was added 0.032 parts of 20% sodium hydroxide and the resulting mixture heated for 45 minutes at 100° C. to give a semisolid material containing one epoxide group per 371 parts.

Example XV

To 7.5 parts of p,p'-dihydroxy diphenyl sulfone and 7.5 parts of diglycid ether was added 0.006 parts of sodium hydroxide and the resulting mixture was heated for 86 minutes at 100° C. to give a product containing 1 epoxide group per 315 parts.

Example XVI

To 50 parts of the product of Example XI was added 19 parts of bis phenol and the resulting mixture was heated for 2 hours and 10 minutes at 162 to 186° C. to give a soft tacky resin having an epoxide equivalent of 440 and a molecular weight of 828.

The foregoing Examples I to XVI illustrate various complex epoxides which can be reacted with the sulfonamides in making the new compositions. The following examples illustrate the new compositions containing the complex epoxides and sulfonamides and the production of reaction products therefrom.

Example XVII

A mixture of 440 parts of the product of Example XVI and 43 parts of p-toluene sulfonamide and 22 parts of sodium phenoxide was dissolved in dioxane to give 75% solids. Films of 0.003 inch thickness baked for ½ hour at 150° C. gave flexible, infusible products.

Example XVIII

The resin used in this example was prepared from 4 mols of resorcinol, 5 mols of epichlorhydrin and 5.5 mols of aqueous sodium hydroxide and had a softening point of 101° C. and an equivalent weight to epoxide of 1278. To 30 parts of this resin was added 0.3 parts of p-toluene sulfonamide. The mixture was heated with stirring to give a clear solution; and this solution was heated to 150° C for 30 minutes to give an insoluble product.

Example XIX

To 30 parts of the resin of the preceding example was added 1.5 parts of p-toluene sulfonamide. The mixture was heated with stirring to give a clear solution; and this solution was further heated at 150° C. for 30 minutes to give an insoluble product.

Example XX

To 30 parts of the resin referred to in Example XVIII was added 0.15 part of p-toluene sulfonamide. The mixture was heated with stirring to give a clear solution; and this solution was further heated at 150° C. for 30 minutes to give an insoluble product.

Example XXI

To 19.1 parts of the product of Example I was added 0.5 parts of p-toluene sulfonamide and 0.02 part of sodium phenoxide. The reaction mixture was heated to 150° C. for 1 hour and then to 200° C. for 2 hours. The product was a resin having a melting point of 58° C.

In a similar manner, other epoxide resins, such as those above referred to, can similarly be reacted with p-toluene sulfonamide and with other sulfonamides such as benzene sulfonamide, naphthalene sulfonamide, etc.

The new compositions made with sulfonamides and complex epoxides in suitable proportions form valuable protective layers and films when used either as clear varnishes or as pigmented varnishes, enabling infusible films to be obtained having remarkable resistance to chemicals and having other valuable desirable properties.

The new compositions are useful in making molded objects and also in impregnating and laminating wood and fabrics and in making self-sustaining films and filaments, etc.

The new sulfonamide epoxy reaction products possess a high adherence to glass, metal, wood, and other surfaces and can be used to advantage in the lamination of glass or metal, in the lamination of wood to form plywood or other laminated wood products, etc.

This application is a continuation-in-part of my prior application Ser. No. 632,595 (now Patent No. 2,589,245) filed December 3, 1945.

I claim:

1. Sulfonamide-epoxy compositions containing in substantial amounts separately produced and admixed anhydrous complex resinous epoxides and aromatic sulfonamides, said complex resinous epoxides being polymetic polyethers of dihydric phenols, which dihydric phenols are free from functional groups other than phenolic hydroxyl groups, said resinous epoxides having a plurality of aromatic nuclei alternating with intermediate and terminal aliphatic chains united through ether oxygen, the aromatic nuclei being the hydrocarbon nuclei of the dihydric phenols, the intermediate aliphatic chains being alcoholic-hydroxyl-containing chains free from functional groups other than alcoholic hydroxyl groups and the terminal aliphatic chains having epoxide and alcoholic hydroxyl groups and being free from other functional groups, and the proportions of admixed complex resinous epoxides and sulfonamides being such that the hydrogens attached to nitrogen of the sulfonamide is substantially less than the number of epoxide groups of the resinous epoxide.

2. Sulfonamide epoxy compositions as defined in claim 1, which also contain an alkaline catalyst selected from the group which consists of alkali metal hydroxides and phenoxides.

3. Sulfonamide epoxy compositions as defined in claim 1 in which the sulfonamide is p-toluene sulfonamide.

4. Sulfonamide epoxy compositions as defined in claim 2 in which the sulfonamide is p-toluene sulfonamide.

5. The process of forming complex sulfonamide epoxy reaction products which comprises heating the composition of claim 1 to a high temperature.

6. The process of forming complex sulfonamide epoxy reaction products which comprises heating the composition of claim 1 to a high temperature together with an alkaline catalyst selected from the group which consists of alkali metal hydroxides and phenoxides.

7. Insoluble, infusible reaction products resulting from the heating at high temperatures of the sulfonamide epoxy compositions of claim 1.

8. Insoluble, infusible reaction products resulting from the heating at high temperatures of the sulfonamide epoxy compositions of claim 2.

9. Insoluble, infusible reaction products resulting from the heating at high temperatures of the sulfonamide epoxy compositions of claim 3.

10. Insoluble, infusible reaction products resulting from the heating at high temperatures of the sulfonamide epoxy compositions of claim 4.

References Cited in the file of this patent

FOREIGN PATENTS 506,999    Great Britain _____ June 5, 1939